H. W. SHIPLEY.
Smut Mill.
No. 30,002.  Patented Sept. 11, 1860.
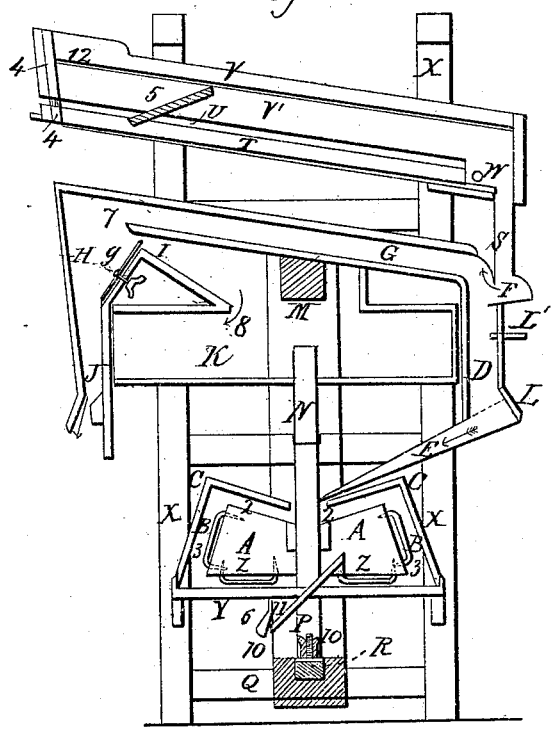
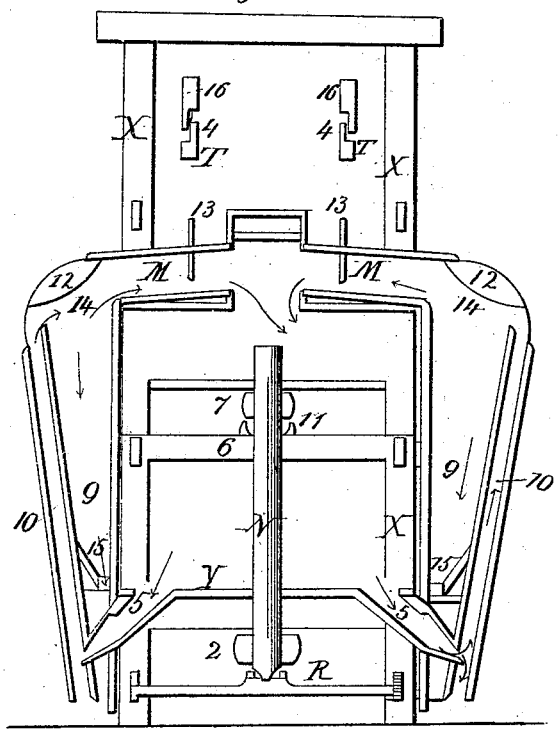
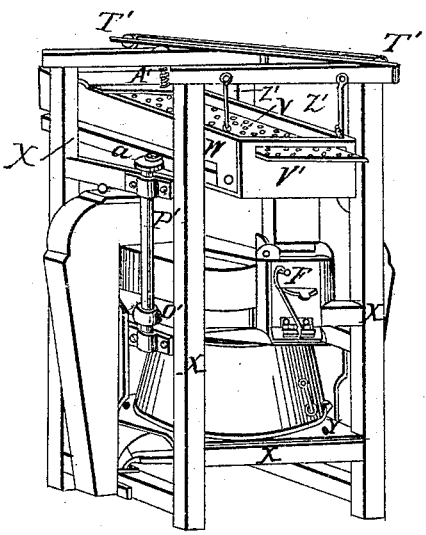
Witnesses:
Inventor:
Henry W. Shipley.

UNITED STATES PATENT OFFICE.

HENRY W. SHIPLEY, OF MOUNT VERNON, OHIO.

SMUT-MACHINE.

Specification of Letters Patent No. 30,002, dated September 11, 1860.

*To all whom it may concern:*

Be it known that I, HENRY W. SHIPLEY, of Mount Vernon, in the county of Knox and State of Ohio, have invented new and useful Improvements in a Combined Screen-Separator and Smut-Machine; and I do hereby declare that the following is a full and complete description of the same, reference being had to the accompanying drawings, making part of this specification, in which—

Figures 1 and 2, are vertical sections at right angles to each other, and Fig. 3, is a perspective view.

I will first describe the parts as shown in Fig. 1.

A, A, is a cone like cylinder, concave above and horizontal beneath, attached to the shaft N, with which it revolves, (the same shaft being shown at N, in Fig. 2).

B, B, (Fig. 1) are beaters, formed of iron rods bent at right angles at the ends, and driven into the inclined sides of the cylinder A as shown in the drawing.

Z Z represent the same form of beaters, driven into the under side of the cylinder A.

C C (Fig. 1,) represent a case, which incloses the parts A, B, Z. The case or rubber C, C, is stationary, and has the same form as the cylinder A which it incloses, and Y, is the bed plate of the case or rubber C, C, which is also stationary.

Q, (Fig. 1,) is an end view of the bridge tree pit, and R is a cross section of the bridge tree, shown also at R (Fig. 2).

P, (Fig. 1,) is a lighter screw, by means of which the shaft N, is raised or lowered, and by this means the space 2, 2, and 3, 3, in Fig. 1, can be increased or diminished, for the purpose of scouring the grain more or less, closely during its passage along the space 2, 3, 2, 3, (Fig. 1).

E, is a spout that conducts the grain to the concave surface of the cylinder A, after its passage through other parts of the machine, as hereinafter described.

D, (Fig. 1) is the descending suction pipe, where the first separation takes place, after the grain has been screened.

F (Fig. 1,) is a receiving spout, where the grain enters the pipe D.

G, represents the top part of the first suction pipe, leading to the chamber H where a separation takes place between the chaff, dust, smut balls, and chess, the heavier particles falling through the discharge pipe J (Fig. 1), while the dust &c. is drawn in at 7, (Fig. 1) by the current that supplies the fan with air.

K, is the chamber for the wings of the fan, which are attached to the main shaft N, in the usual form.

L, L′ represent valves, which are used to regulate the strength of the current of air, in the suction pipe D.

M, is a cross section of a side suction pipe, shown also at M, M, Fig. 2.

S, (Fig. 1,) is a spout, that conveys the grain from the screen to the receiving spout F.

T, in Figs. 1 and 2, represents the lower part of the inclined screen, by means of which, a partial separation takes place between the grain and the tares.

V, V′ (Fig. 1,) represent the upper screen where straws, sticks &c. are separated from the wheat.

U, (Fig. 1,) is a space between the upper and lower screens, to admit of a vertical, or jarring motion to the lower screen T.

W, is a pin or pivot by means of which, the upper and lower screens are secured to each other, and upon which the lower screen articulates.

X, in the several figures, represents the frame of the machine.

Y, in the several figures represents the bed plate, to which is attached the part C, C, (in Fig. 1).

4, 4, in Figs. 1 and 2, show how the two screens. lap together, so that they both have a sidewise movement by means of the wheel *a*, upon the shaft, P′ in Fig. 3, and at the same time allow the lower screen, T, a vertical jarring motion.

The arrows, seen at 7 and 8, (Fig. 1) show the direction given to the dust and chaff.

At 9, (Fig. 1,) is seen a slide bolt and thumb screw, for the purpose of securing the valve, that opens and closes the aperture I, for the purpose of regulating the draft of air.

11, (Fig. 1,) shows the manner in which the suction pipes 10 in Fig. 2, are contracted at the bottom, and closed by the valve 6, seen in Fig. 1.

Fig. 2, is a vertical, sectional view at right angles to Fig. 1.

2, (Fig. 2) represents a pulley, by which motion is given to the machine.

Y, (Fig. 2) is the bed-plate, with spouts 5, 5, (Fig. 2) attached to it, for the purpose of dividing the grain into two equal parts as it leaves the rubber, for the purpose of exposing it more effectually to the action of the draft, to cleanse it from the dust removed by the action of the beaters.

10, 10 (Fig. 2,) are chambers, where the particles that are separated from the good grain, are carried over into the large chamber 14, (Fig. 2), and 9, (Fig. 2), where another separation takes place. The hulls, dust, and chaff, are drawn into the fan, and blown out of the mill by an orifice on the back side of Fig. 3, not shown in the drawing. The light grains of wheat and chess, descend in the direction of the arrows in the chambers 9, (Fig. 2), and are discharged at the valve 15, (Fig. 2,) and being free from dust, is ready to be ground into feed.

12, 12, (Fig. 2,) are curved valves, for the purpose of deflecting the current of air, into the chamber 14, (Fig. 2).

5, (Fig. 1) represents an inclined plane, that receives the grain after it has passed through the first or upper screen, and conveys it back to the head of the lower screen. The upper end of the screen is hung to the frame by a rod and spiral spring A'. The lower end is suspended by the rods Z' Z' both these are shown in Fig. 3. The lower end of the screen, seen at V' in Fig. 3, has a horizontal motion by means of the wheel a, upon the top of the shaft P' a connecting rod reaching from an eccentric pin to the screen. The highest end of the lower screen, receives a short vertical motion by means of a cord attached to the lower screen, and passing over the pulleys T' T', (Fig. 3) is attached to the free end V', Fig. 3, so that every time the free end swings sidewise the cord that passes over the pulleys T', T', is made to draw upon the end of the lower screen, and this gives it a sudden jerk upward, and this compound motion, aids greatly in separating the tares, and in keeping the screen from becoming clogged.

In using this machine, the grain falls upon the screen at 12 (Fig. 1) passes through the upper screen, and is carried to the head of the lower screen by the inclined plane 5 (Fig. 1), thence along the screen to the pipe S, down D, and along E to the center of the concave in the cylinder A, (Fig. 1), thence it passes upward over the edge of the concave, and is exposed to the action of the beaters B, Z, as specified.

What I claim as my improvement and desire to secure by Letters Patent, is—

The concave, conelike cylinder A, A the correspondingly shaped case C, C, and beaters B, Z, in combination and operating as described.

HENRY W. SHIPLEY.

Witnesses:
J. BRAINERD,
W. H. COCHRAN.